US006894086B2

(12) United States Patent
Munro et al.

(10) Patent No.: US 6,894,086 B2
(45) Date of Patent: May 17, 2005

(54) COLOR EFFECT COMPOSITIONS

(75) Inventors: Calum H. Munro, Wexford, PA (US); Mark D. Merritt, Allison Park, PA (US); Paul H. Lamers, Steinheim (DE)

(73) Assignee: PPG Industries Ohio, Inc., Cleveland, OH (US)

( * ) Notice: Subject to any disclaimer, the term of this patent is extended or adjusted under 35 U.S.C. 154(b) by 215 days.

(21) Appl. No.: 10/034,825

(22) Filed: Dec. 27, 2001

(65) Prior Publication Data

US 2003/0125416 A1 Jul. 3, 2003

(51) Int. Cl.$^7$ .............................. C08K 7/02; C08K 3/18; C08K 3/22

(52) U.S. Cl. ...................... 523/105; 523/221; 523/223; 524/401; 524/430; 524/500; 524/513; 524/515; 264/1.7; 264/1.9; 428/144; 428/426; 428/457

(58) Field of Search ................................ 523/105, 221, 523/223; 524/401, 430, 500, 513, 515; 264/1.7, 1.9; 428/426, 457, 144

(56) References Cited

U.S. PATENT DOCUMENTS

| | | | |
|---|---|---|---|
| 5,122,905 A | 6/1992 | Wheatley et al. ........... 359/586 |
| 5,281,370 A | 1/1994 | Asher et al. .................. 264/1.1 |
| 5,527,386 A | 6/1996 | Statz ........................... 106/481 |
| 5,624,731 A | 4/1997 | Desjardins ................... 428/143 |
| 5,711,884 A | 1/1998 | Asher et al. ................. 210/650 |
| 5,783,120 A | 7/1998 | Ouderkirk et al. .......... 264/1.34 |
| 5,824,733 A | 10/1998 | Döbert et al. ................ 524/506 |
| 5,932,309 A | * 8/1999 | Smith et al. ................... 428/46 |
| 6,337,131 B1 | 1/2002 | Rupaner et al. ............. 428/403 |

FOREIGN PATENT DOCUMENTS

EP   0 955 323 A1   11/1999

OTHER PUBLICATIONS

Pfaff et al., "Angle–Dependent Optical Effect Deriving from Submicron Structures of Films and Pigments", Chem. Rev. 1999, 99, 1963–1981.

* cited by examiner

Primary Examiner—Kriellion A. Sanders
(74) Attorney, Agent, or Firm—William J. Uhl

(57) ABSTRACT

A coating composition comprising a resinous binder and a color effect colorant in particulate form. The colorant includes an ordered periodic array of particles held in a polymer wherein a difference in refractive index between the polymer and the particles is at least about 0.01. The colorant reflects visible light according to Bragg's law to yield a goniochromatic effect to the coating composition.

73 Claims, 2 Drawing Sheets

COLOR EFFECT COMPOSITIONS

BACKGROUND OF THE INVENTION

1. Field of the Invention

This invention relates to color effect pigments, to processes by which these pigments are made and, more particularly, to the use thereof to provide a goniochromatic finish.

2. Prior Art

Goniochromaticity is the effect of perceived color varying as the angle of illumination or observation varies. Goniochromatic pigments are used, for example, in automotive coatings, decorative coatings, plastic pigmentation, printing inks (security inks in particular), textiles, and cosmetics. Their optical effect results from the directional reflection of light from predominantly sheet-like particles that conventionally are metallic or that have a structured refractive index contrast, the length scale of which is comparable to the wavelength of light. According to the nature of the pigment particles, the pigments are known as metallic effect pigments (for example, aluminum, zinc, copper or alloys thereof) or interference pigments (for example, based on titanium dioxide-coated mica, such as muscovite, phlogopite, and biotite).

As a result of the incident light being reflected directionally by the predominantly sheet-like particles, color effect pigments that are oriented, for example, in a coating, exhibit goniochromaticity; that is, their perceived color (lightness and/or hue and/or chroma) varies with the angle of illumination or observation.

Interference pigments may comprise a single plate-like layer, or a multilayer structure. The color perceived is affected by, for example, interference in the thin layer or layers, and optionally also by absorption by a chromophore (an organic moiety or inorganic complex that absorbs wavelengths of light in the visible and/or UV ranges) or a color center. A color center is an electron hole pair that results from a lattice defect in a crystalline solid-state material and which absorbs wavelengths in the visible and/or UV ranges. Interference, with or without absorption, results in a multiplicity of hue variations that are dependent on the thickness of the thin layer or layers and the effective refractive index of the layer or layers.

Color effect pigments that rely upon interference phenomena generated by the presence of one or more thin layers to develop high chroma (i.e., purity of color) generally use one to five thin layers of materials that have high refractive index contrast. Examples of this type are generally known and include, but are not limited to, metal oxide-coated silicatic (including mica) and metallic pigments. The density of such metal-containing materials is typically 2 to 4 times greater than the density of their surrounding coating composition (e.g. in a paint). As a result, these metal-containing materials tend to settle out which may result in a non-uniform color effect of the coating composition.

One approach that avoids the problems associated with metal-containing materials has been in the use of organic liquid crystals, such as disclosed in U.S. Pat. No. 5,824,733. However, liquid crystals are not as physically durable as metal-containing color effect materials in a coating composition and their highly aromatic composition is subject to photodegradation with concomitant change or loss of their color effect which is highly undesirable.

While pigment particles of multilayer metal-containing materials have been successfully used for their angle-dependent optical properties, multilayered organic materials have been limited to use in film form. U.S. Pat. No. 5,122,905 describes a multilayered organic film for use as a reflective sheet or body. Similarly, U.S. Pat. No. 5,783,120 discloses an optical film of polymeric particles dispersed in a matrix. These materials are flexible and malleable and, hence, not suitable for conversion to particulate form as pigments.

More recently, matrices of polymeric particles have been used as radiation filters. Examples of these matrices are described in a family of patents including U.S. Pat. Nos. 5,281,370; 5,711,884; 5,944,994; 6,001,251; and 6,123,845. The matrices are formed from an ordered array in a hydrogel membrane of particles of polystyrene, polymethylmethacrylate, silicon dioxide, aluminum oxide, or fluorinated polymers in a fluid medium. The array selectively filters a narrow band of wavelengths of light (radiation) from a broader spectrum of incident light. The particles are maintained in an ordered array by various techniques including evaporating the surrounding liquid and fusing the particles together, polymerizing the particles to each other, solidifying the surrounding liquid (such as by polymerization), or subjecting similarly charged particles to an electric field. The arrays are capable of Bragg diffracting radiation into reflected light and transmitted light. These gel membranes exhibit some refractive properties when broken into small pieces and mixed into a coating composition. However, their utility as a colorant in, for example, plastics or coating compositions, such as paint, is limited due to their gelatinous nature. The gelatinous materials can be readily deformed or can be swollen or de-swollen with water or organic solvents causing changes or inhomogeneities in the perceived color effect, which is undesirable.

Accordingly, a need remains for durable goniochromatic materials that can be produced in particulate form and are suitable for use as colorants.

SUMMARY OF THE INVENTION

The present invention provides radiation diffractive materials in particulate form which may act as color effective pigments, termed "colorants". All references to "colorant" hereinafter are equally applicable to the general characterization of the present invention as radiation diffractive material except that "colorants" specifically reflect radiation in the visible spectrum while radiation diffractive material references material which reflects any wavelength of electromagnetic radiation. The colorant includes an ordered periodic array of particles held in a matrix wherein the difference in refractive index between the matrix and the particles is at least about 0.01, preferably at least about 0.05, and, more preferably, at least about 0.1. The matrix may be an organic polymer, such as a polyurethane, polycarbonate, polystyrene, acrylic, alkyd, polyester, siloxane, polysulfide, epoxy or mixtures thereof and, preferably, is cross-linked. Alternatively, the matrix may be an inorganic polymer, such as a metal oxide (e.g. alumina, silica or titanium dioxide) or a semiconductor (e.g. cadmium selenide).

The array of particles can be greater than several millimeters thick. For ease of use as a colorant in a form analogous to a conventional effect pigment particle, the array of particles is preferably a maximum of about 20 microns thick, more preferably a maximum of about 10 microns thick, most preferably a maximum of about 5 microns thick. The aspect ratio of the particles is at least about 2, more preferably about 5 to 100, most preferably about 10. The particles in the array are preferably similarly sized and differ in size by up to about 5 to about 15%. Typically, the array includes at least about 5 layers of the particles, more preferably about 10 to about 30 layers of the particles. The particles may be composed of an organic polymer, such as a polyurethane, polycarbonate, polystyrene, an acrylic polymer, an alkyd polymer, polyester, siloxane, polysulfide, an epoxy containing polymer or a polymer derived from an epoxy-containing polymer and, preferably, is cross-linked. Alternatively, the particles may be composed of an inorganic material, such as a metal oxide (e.g. alumina, silica or titanium dioxide) a semiconductor (e.g. cadmium selenide).

The particles are fixed in the polymeric matrix by providing a dispersion of the particles, bearing a similar charge, in a carrier, applying the dispersion onto a substrate, evaporating the carrier to produce an ordered periodic array of the particles on the substrate, coating the array of particles with the polymer, and curing the polymer to fix the array of particles within the polymer. The dispersion may contain about 1 to about 70 vol. % of the charged particles, preferably about 30 to about 65 vol. % of the charged particles. The fixed array is removed from the substrate and converted into particulate form. The substrate may be a flexible material (such as a polyester film) or an inflexible material (such as glass). The dispersion can be applied to the substrate by dipping, spraying, brushing, roll coating, curtain coating, flow coating or die coating to a desired thickness, preferably a maximum thickness of about 20 microns, more preferably a maximum of about 10 microns, most preferably a maximum of about 5 microns. The fixed array of particles is removed from the substrate in the form of an extended film or in the form of flakes that may be suspended in a coating composition.

DETAILED DESCRIPTION OF THE INVENTION

For purposes of the description hereinafter, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The colorant of the present invention includes an ordered periodic array of particles held in a polymeric matrix wherein a difference in refractive index between the polymer and the particles is at least about 0.01, preferably at least about 0.05, most preferably at least about 0.1.

Figure 1:
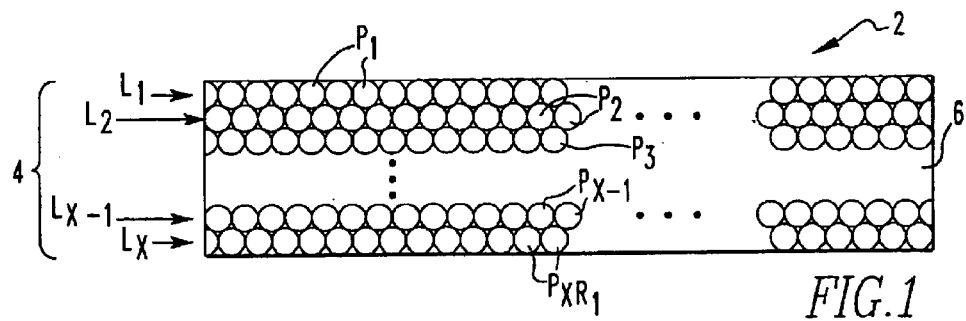
FIG. 1 is a cross-section of a colorant made in accordance with the present invention.

As shown in FIG. 1, the colorant 2 includes an array 4 of particles $P_1$, $P_2$, ... $P_{x-1}$, and $P_x$ held in a polymeric matrix 6. The particles are arranged in layers $L_1$, $L_2$, ... $L_{x-1}$, and $L_x$ stacked upon each other so that the surfaces of the particles $P_1$–$P_x$ contact each other. The surface of each particle contacts at least one other particle. The particles $P_1$–$P_x$ may be composed of an organic polymer, such as a polyurethane, polycarbonate, polystyrene, an acrylic polymer, an alkyd polymer, polyester, siloxane polymer, polysulfide, an epoxy-containing polymer or a polymer derived from an epoxy-containing polymer and, preferably, is cross-linked. Alternatively, the particles $P_1$–$P_x$ may be composed of an inorganic polymer, such as a metal oxide (e.g. alumina, silica or titanium dioxide) or a semiconductor (e.g. cadmium selenide).

The particles charged $P_1$–$P_x$ are purified from the dispersion by means, such as ultrafiltration, dialysis or ion exchange to remove undesired materials, such as unreacted monomer, small polymers, water, initiator, surfactant, unbound salt, and grit (agglomerated particles) to produce a monodispersion of the charged particles $P_1$–$P_x$. Ultrafiltration is a preferred technique for purifying the charged particles $P_1$–$P_x$. It has been found that following an ultrafiltration step, the charged particles $P_1$–$P_x$ become ordered into the array 4. Upon removal of the excess raw materials, by-products, solvent, and the like, the particles $P_1$–$P_x$ naturally align themselves into the array 4 due to their similar (repellant) charges. When in a dispersion with other materials (e.g. salts or by-products) the repelling forces of the charged particles is mitigated. However, when the dispersion is purified to essentially contain only the charged particles $P_1$–$P_x$, the particles $P_1$–$P_x$ readily repel each other and form an ordered array.

The polymeric matrix 6 preferably is a curable polymeric composition, such as a UV curable composition with high acrylate content. Suitable polymers for the matrix 6 include polyurethanes, acrylic polymers, alkyd polymers, polyesters, siloxane-containing polymers, polysulfides, epoxy-containing polymers, and polymers derived from epoxy-containing polymers. The polymeric matrix 6 may comprise substantially one polymer material or may be a mixture of a plurality of suitable polymer materials. Table 1 provides a list of representative materials for each of the particles $P_1$–$P_x$ and the polymer matrix 6 and their refractive indices.

TABLE 1

| Polymer Composition | Refractive Index | Polymer Composition | Refractive Index |
|---|---|---|---|
| Poly(hexafluoropropylene oxide) | 1.301 | Alginic acid, sodium salt | 1.3343 |
| Hydroxypropyl cellulose | 1.337 | Poly(tetrafluoroethylene-co-hexafluoropropylene) | 1.338 |
| Poly(pentadecafluorooctylacrylate) | 1.339 | Poly(tetrafluoro-3-(heptafluoropropoxy)propyl acrylate) | 1.346 |
| Poly(tetrafluoro-3-(pentafluoroethoxy)propyl acrylate) | 1.348 | Poly(tetrafluoroethylene) | 1.35 |
| Poly(undecafluorohexyl acrylate) | 1.356 | Poly(nonafluoropentyl acrylate) | 1.36 |
| Poly(tetrafluoro-3-(trifluoromethoxy)propyl acrylate) | 1.36 | Poly(pentafluorovinyl propionate) | 1.364 |
| Poly(heptafluorobutyl acrylate) | 1.367 | Poly(trifluorovinyl acetate) | 1.375 |
| Poly(octafluoropentyl acrylate) | 1.38 | Poly(methyl 3,3,3-trifluoropropyl siloxane) | 1.383 |
| Poly(pentafluoropropyl acrylate) | 1.385 | Poly(2-heptafluorobutoxy)ethyl acrylate) | 1.39 |
| Poly(chlorotrifluoroethylene) | 1.39 | Poly(2,2,3,4,4-hexafluorobutyl acrylate) | 1.392 |
| Poly(methyl hydro siloxane) | 1.397 | Poly(methacrylic acid), sodium salt | 1.401 |
| Poly(dimethyl siloxane) | 1.4035 | Poly(trifluoroethyl acrylate) | 1.407 |
| Poly(2-(1,1,2,2-tetrafluoroethoxy)ethyl acrylate) | 1.412 | Poly(trifluoroisopropyl methacrylate) | 1.4177 |
| Poly(2,2,2-trifluoro-1-methylethyl) methacrylate) | 1.4185 | Poly(2-trifluoroethoxyethyl acrylate) | 1.419 |

TABLE 1-continued

| Polymer Composition | Refractive Index |
|---|---|
| Poly(vinylidene fluoride) | 1.42 |
| Poly(methyl octadecyl siloxane) | 1.443 |
| Poly(methyl octyl siloxane) | 1.445 |
| Poly(vinyl isobutyl ether) | 1.4507 |
| Poly(ethylene oxide) | 1.4539 |
| Poly(methyl tetradecyl siloxane) | 1.455 |
| Poly(vinyl n-butyl ether) | 1.4563 |
| Poly(3-butoxypropylene oxide) | 1.458 |
| Poly(ethylene glycol) | 1.459 |
| Poly(vinyl n-hexyl ether) | 1.4591 |
| Poly(vinyl octyl ether) | 1.4613 |
| Poly(vinyl 2-ethylhexyl ether) | 1.4626 |
| Poly(2-methoxyethyl acrylate) | 1.463 |
| Poly(4-methyl-1-pentene) | 1.463 |
| Poly(t-butyl methacrylate) | 1.4638 |
| Poly(3-ethoxypropyl acrylate) | 1.465 |
| Poly(vinyl acetate) | 1.4665 |
| Poly(vinyl methyl ether) | 1.467 |
| Poly(vinyl methyl ether) (isotactic) | 1.47 |
| Poly(1-octadecene) | 1.471 |
| Poly(isopropyl acrylate) | 1.4728 |
| Poly(propylene atactic) | 1.4735 |
| Poly(vinyl sec-butyl ether) (isotactic) | 1.474 |
| Poly(dodecyl methacrylate) | 1.474 |
| Poly(tetradecyl methacrylate) | 1.4746 |
| Cellulose acetate butyrate | 1.475 |
| Poly(vinyl formate) | 1.4757 |
| Poly(2-fluoroethyl methacrylate) | 1.4768 |
| Ethyl cellulose | 1.479 |
| Poly(dicyanopropyl siloxane) | 1.48 |
| Poly(sec-butyl methacrylate) | 1.48 |
| Poly(n-hexyl methacrylate) | 1.4813 |
| Poly(n-butyl methacrylate) | 1.483 |
| Poly(2-ethoxyethyl methacrylate) | 1.4833 |
| Poly(ethylene maleate) | 1.484 |
| Poly(ethyl methacrylate) | 1.485 |
| Poly(vinyl butyral)—11% hydroxyl | 1.485 |
| Poly(2-nitro-2-methyl-propyl methacrylate) | 1.4868 |
| Poly(1,1-diethylpropyl methacrylate) | 1.4889 |
| Poly(methyl methacrylate) | 1.4893 |
| Poly(trifluoroethyl methacrylate) | 1.437 |
| Poly(methyl hexyl siloxane) | 1.443 |
| Poly(isobutyl methacrylate) | 1.447 |
| Poly(methyl hexadecyl siloxane) | 1.451 |
| Poly(vinyl ethyl ether) | 1.454 |
| Poly(ethylene glycol monomethyl ether) | 1.4555 |
| Poly(propylene oxide) | 1.457 |
| Poly(3-hexoxy-propylene oxide) | 1.459 |
| Poly(vinyl n-pentyl ether) | 1.459 |
| Poly(4-fluoro-2-trifluoromethylstyrene) | 1.46 |
| Poly(vinyl n-octyl acrylate) | 1.4613 |
| Poly(vinyl n-decyl ether) | 1.4628 |
| Poly(acryloxypropyl methyl siloxane) | 1.463 |
| Poly(3-methoxy-propylene oxide) | 1.463 |
| Poly(vinyl n-dodecyl ether) | 1.464 |
| Poly(vinyl propionate) | 1.4664 |
| Poly(vinyl propionate) | 1.4665 |
| Poly(ethyl acrylate) | 1.4685 |
| Poly(3-methoxypropyl acrylate) | 1.471 |
| Poly(2-ethoxyethyl acrylate) | 1.471 |
| Poly(1-decene) | 1.473 |
| Poly(lauryl methacrylate) | 1.474 |
| Poly(n-butyl acrylate) | 1.474 |
| Poly(ethylene succinate) | 1.4744 |
| Poly(hexadecyl methacrylate) | 1.475 |
| Cellulose acetate | 1.475 |
| Ethylene/vinyl acetate copolymer—40% vinyl acetate | 1.476 |
| Poly(octyl methyl silane) | 1.478 |
| Poly(methyl acrylate) | 1.4793 |
| Poly(oxymethylene) | 1.48 |
| Poly(dimethylsiloxane-co-alpha-methyl styrene) | 1.48 |
| Ethylene/vinyl acetate copolymer—33% vinyl acetate | 1.482 |
| Poly(ethylidene dimethacrylate) | 1.4831 |
| Poly(n-propyl methacrylate) | 1.484 |
| Ethylene/vinyl acetate copolymer—28% vinyl acetate | 1.4845 |
| Poly(vinyl butyral) | 1.485 |
| Poly(3,3,5-trimethyl—cyclohexyl methacrylate) | 1.485 |
| Poly(dimethylsiloxane-co-diphenylsiloxane) | 1.488 |
| Poly(triethylcarbinyl methacrylate) | 1.4889 |
| Poly(2-decyl-1,4-butadiene) | 1.4899 |
| Polypropylene, isotactic | 1.49 |
| Poly(mercaptopropyl methyl siloxane) | 1.49 |
| Poly(3-methylcyclohexyl methacrylate) | 1.4947 |
| Methyl cellulose | 1.497 |
| Poly(decamethylene glycol dimethacrylate) | 1.499 |
| Poly(vinyl formal) | 1.5 |
| Poly(1,2-butadiene) | 1.5 |
| Poly(2-heptyl-1,4-butadiene) | 1.5 |
| Poly(ethyl alpha-chloro-acrylate) | 1.502 |
| Poly(2-isopropyl-1,4-butadiene) | 1.502 |
| Poly(bornyl methacrylate) | 1.5059 |
| Poly(ethylene glycol dimethacrylate) | 1.5063 |
| Poly(cyclohexanediol-1,4-dimethacrylate) | 1.5067 |
| Gutta percha b | 1.509 |
| Poly(isobutylene) | 1.51 |
| Ethylene/methacrylic acid ionomer, sodium ion | 1.51 |
| Cellulose nitrate | 1.51 |
| Polyacetal | 1.51 |
| Poly(2-hydroxyethyl methacrylate) | 1.5119 |
| Poly(vinyl methacrylate) | 1.5129 |
| Poly(N-butyl methacrylamide) | 1.5135 |
| Poly(2-chloroethyl methacrylate) | 1.517 |
| Poly(2-diethylaminoethyl methacrylate) | 1.5174 |
| Poly(1,4-butadiene) | 1.518 |
| Poly(isoprene), cis | 1.5191 |
| Poly(methacrylonitrile) | 1.52 |
| Poly(butadiene-co-acrylonitrile) | 1.52 |
| Poly(1,4-butadiene) (high cis-type) | 1.52 |
| Poly(2,3-dimethyl-butadiene) [methyl rubber] | 1.525 |
| Poly(1,3-dichloropropyl methacrylate) | 1.527 |
| Poly(N-vinyl pyrrolidone) | 1.53 |
| Poly(butadiene-co-styrene) (30% styrene) block copolymer | 1.53 |
| Poly(methyl phenyl siloxane) | 1.533 |
| Poly(butadiene-co-styrene) (75/25) | 1.535 |
| Poly(furfuryl methacrylate) | 1.5381 |
| Poly(butylmercaptyl methacrylate) | 1.539 |
| Poly(N-methyl methacrylamide) | 1.5398 |
| Poly(vinyl butyral)—19% hydroxyl | 1.49 |
| Poly(ethyl glycolate methacrylate) | 1.4903 |
| Poly(cyclohexyl alpha-ethoxyacrylate) | 1.4969 |
| Poly(4-methylcyclohexyl methacrylate) | 1.4975 |
| Poly(vinyl alcohol) | 1.5 |
| Poly(2-bromo-4-trifluoromethyl styrene) | 1.5 |
| Poly(sec-butyl alpha-chloroacrylate) | 1.5 |
| Poly(vinylmethyl ketone) | 1.5 |
| Poly(vinyl formal) | 1.502 |
| Poly(2-methylcyclohexyl methacrylate) | 1.5028 |
| Poly(2-t-butyl-1,4-butadiene) | 1.506 |
| Poly(cyclohexyl methacrylate) | 1.5065 |
| Butyl rubber (unvulcanized) | 1.508 |
| Poly(tetrahydrofurfuryl methacrylate) | 1.5096 |
| Polyethylene, low density | 1.51 |
| Polyethylene | 1.51 |
| Polyethylene Ionomer | 1.51 |
| Poly(1-methylcyclohexyl methacrylate) | 1.5111 |
| Poly(1-butene) (isotactic) | 1.5125 |
| Poly(vinyl chloroacetate) | 1.513 |
| Gutta percha a | 1.514 |
| Poly(methyl alpha-chloroacrylate) | 1.517 |
| Poly(2-chlorocyclohexyl methacrylate) | 1.5179 |
| Poly(acrylonitrile) | 1.5187 |
| Poly(allyl methacrylate) | 1.5196 |
| Poly(methyl iso-propenyl ketone) | 1.52 |
| Poly(2-ethyl-2-oxazoline) | 1.52 |
| Poly(N-2-methoxy-ethyl)methacryl-amide | 1.5246 |
| Poly(2-chloro-1-(chloromethyl)ethyl methacrylate) | 1.527 |
| Poly(acrylic acid) | 1.527 |
| Nylon 6 [Poly(caprolactam)] | 1.53 |
| Poly(cyclohexyl alpha-chloroacrylate) | 1.532 |
| Poly(2-chloroethyl alphachloroacrylate) | 1.533 |
| Poly(2-aminoethyl methacrylate) | 1.537 |
| Poly(vinyl chloride) | 1.539 |
| Poly(1-phenyl-n-amyl methacrylate) | 1.5396 |
| Polyethylene, high density | 1.54 |

TABLE 1-continued

| Polymer Composition | Refractive Index | Polymer Composition | Refractive Index |
|---|---|---|---|
| Cellulose | 1.54 | Poly(cyclohexyl alpha-bromoacrylate) | 1.542 |
| Poly(sec-butyl alpha-bromoacrylate) | 1.542 | Poly(2-bromoethyl methacrylate) | 1.5426 |
| Poly(dihydroabietic acid) | 1.544 | Poly(abietic acid) | 1.546 |
| Poly(ethylmercaptyl methacrylate) | 1.547 | Poly(N-allyl methacrylamide) | 1.5476 |
| Poly(1-phenylethyl methacrylate) | 1.5487 | Poly(2-vinyltetra-hydrofuran) | 1.55 |
| Poly(vinylfuran) | 1.55 | Poly(methyl m-chlorophenylethyl siloxane) | 1.55 |
| Poly(p-methoxybenzyl methacrylate) | 1.552 | Poly(isopropyl methacrylate) | 1.552 |
| Poly(p-isopropyl styrene) | 1.554 | Poly(isoprene), chlorinated | 1.554 |
| Poly(p,p'-xylylenyl dimethacrylate) | 1.5559 | Poly(cyclohexyl methyl silane) | 1.557 |
| Poly(1-phenylallyl methacrylate) | 1.5573 | Poly(p-cyclohexyl-phenyl methacrylate) | 1.5575 |
| Poly(chloroprene) | 1.558 | Poly(2-phenylethyl methacrylate) | 1.5592 |
| Poly(methyl m-chlorophenyl siloxane) | 1.56 | Poly[4,4-heptane bis(4-phenyl) carbonate] | 1.5602 |
| Poly[1-(o-chlorophenyl) ethyl methacrylate)] | 1.5624 | Styrene/maleic anhydride copolymer | 1.564 |
| Poly(1-phenylcyclohexyl methacrylate) | 1.5645 | Nylon 6, 10 [Poly(hexamethylene sebacamide)] | 1.565 |
| Nylon 6,6 [Poly(hexamethylene adipamide)] | 1.565 | Nylon 6(3)T [Poly(trimethyl hexamethylene terephthalamide)] | 1.566 |
| Poly(2,2,2'-trimethylhexamethylene terephthalamide) | 1.566 | Poly(methyl alpha-bromoacrylate) | 1.5672 |
| Poly(benzyl methacrylate) | 1.568 | Poly[2-(phenyl-sulfonyl)ethyl methacrylate] | 1.5682 |
| Poly(m-cresyl methacrylate) | 1.5683 | Styrene/acrylonitrile copolymer | 1.57 |
| Poly(o-methoxyphenol methacrylate) | 1.5705 | Poly(phenyl methacrylate) | 1.5706 |
| Poly(o-cresyl methacrylate) | 1.5707 | Poly(diallyl phthalate) | 1.572 |
| Poly(2,3-dibromopropyl methacrylate) | 1.5739 | Poly(2,6-dimethyl-p-phenylene oxide) | 1.575 |
| Poly(ethylene terephthalate) | 1.575 | Poly(vinyl benozoate) | 1.5775 |
| Poly[2,2-propane bis[4-(2-methylphenyl)] carbonate] | 1.5783 | Poly[1,1-butane bis(4-phenyl)carbonate] | 1.5792 |
| Poly(1,2-diphenylethyl methacrylate) | 1.5816 | Poly(o-chlorobenzyl methacrylate) | 1.5823 |
| Poly(m-nitrobenzyl methacrylate) | 1.5845 | Poly(oxycarbonyloxy-1,4-phenyleneiso-propylidene-1,4-phenylene) | 1.585 |
| Poly[N-(2-phenyl-ethyl)methacrylamide] | 1.5857 | Poly(1,1-cyclohexane bis[4-(2,6-dichlorophenyl)carbonate] | 1.5858 |
| Polycarbonate resin | 1.586 | Bisphenol-A polycarbonate | 1.586 |
| Poly(4-methoxy-2-methylstyrene) | 1.5868 | Poly(o-methyl styrene) | 1.5874 |
| Polystyrene | 1.5894 | Poly[2,2-propane bis[4-(2-chloro-phenyl)]carbonate] | 1.59 |
| Poly[1,1-cyclohexane bis(4-phenyl)carbonate] | 1.59 | Poly(o-methoxy styrene) | 1.5932 |
| Poly(diphenylmethyl methacrylate) | 1.5933 | Poly[1,1-ethane bis(4-phenyl)carbonate] | 1.5937 |
| Poly(propylene sulfide) | 1.596 | Poly(p-bromophenyl methacrylate) | 1.5964 |
| Poly(N-benzyl methacrylamide) | 1.5965 | Poly(p-methoxy styrene) | 1.5967 |
| Poly(4-methoxystyrene) | 1.5967 | Poly[1,1-cyclopentane bis(4-phenyl) carbonate] | 1.5993 |
| Poly(vinylidene chloride) | 1.6 | Poly(o-chlorodiphenyl-methyl methacrylate) | 1.604 |
| Poly[2,2-propane bis[4-(2,6-dichlorophenyl)] carbonate] | 1.6056 | Poly(pentachloro-phenyl methacrylate) | 1.608 |
| Poly(2-chlorostyrene) | 1.6098 | Poly(alpha-methyl-styrene) | 1.61 |
| Poly(phenyl alpha-bromoacrylate) | 1.612 | Poly(2,2-propanebis[4-(2,6-dibromophenyl) cabonate] | 1.6147 |
| Poly(p-divinylbenzene) | 1.615 | Poly(N-vinyl phthalimide) | 1.62 |
| Poly(2,6-dichloro-styrene) | 1.6248 | Poly(chloro-p-xylene) | 1.629 |
| Poly(beta-naphthyl methacrylate) | 1.6298 | Poly(alpha-naphthyl carbinyl methacrylate) | 1.63 |
| Poly(phenyl methyl silane) | 1.63 | Poly(sulfone) [Poly[4,4-isopropyl-idene diphenoxy di(4-phenylene)sulfone]] | 1.633 |
| Polysulfone resin | 1.633 | Poly(2-vinylthiophene) | 1.6376 |
| Poly (2,6-diphenyl-1,4-phenylene oxide) | 1.64 | Poly(alpha-naphthyl methacrylate) | 1.641 |
| Poly(p-phenylene ether-sulphone) | 1.65 | Poly[diphenylmethane bis(4-phenyl) carbonate] | 1.6539 |
| Poly(vinyl phenyl sulfide) | 1.6568 | Poly(styrene sulfide) | 1.6568 |
| Butylphenol formaldehyde resin | 1.66 | Poly(p-xylene) | 1.669 |
| Poly(2-vinylnaphthalene) | 1.6818 | Poly(N-vinyl carbazole) | 1.683 |
| Naphthalene-formaldehyde rubber | 1.696 | Phenol-formaldehyde resin | 1.7 |
| Poly(pentabromophenyl methacrylate) | 1.71 | | |

The colorant 2 is non-gelatinous and substantially solid. By non-gelatinous it is meant that the colorant 2 does not contain a fluidizing material, such as water. The colorant substantially only includes the particles $P_1$–$P_x$ and the polymer matrix 6 with some residual solvent (e.g. about 1 vol. % or less) and, thus, is substantially solid. The volumetric ratio of the particles $P_1$–$P_x$ to the polymer matrix 6 in the colorant 2 is about 25:75 to about 80:20, preferably about 72:28 to about 76:24. It should be understood that all ranges of values stated herein include the end points of the ranges and all values intermediate the stated range endpoints.

Figure 2:
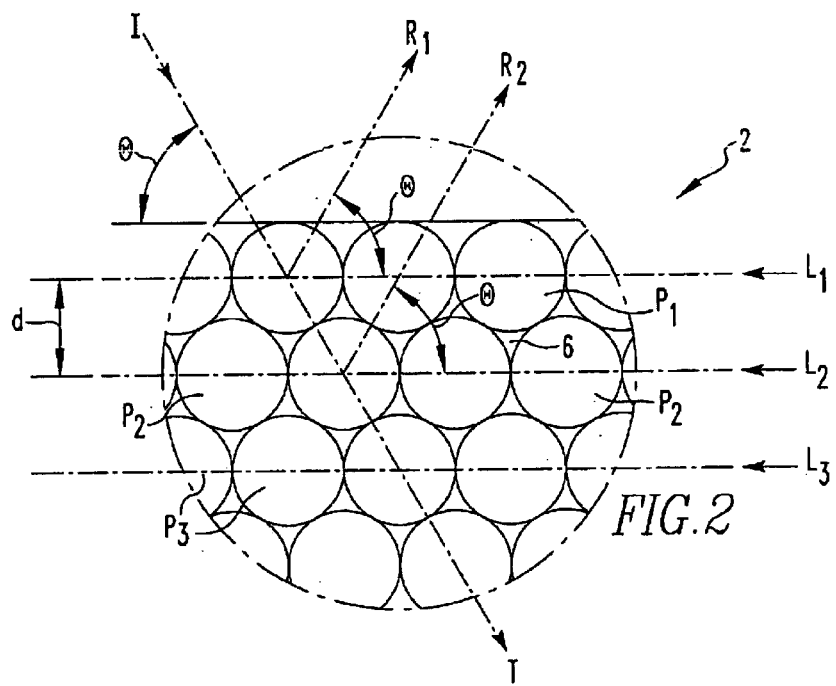
FIG. 2 is a detailed view of the colorant of FIG. 1 showing Bragg diffraction of visible light at one viewing angle.

The particles $P_1$–$P_x$ arranged in the periodic array shown in FIG. 1 diffract light according to Bragg's law. Referring to FIG. 2, an incident ray of light I is partially reflected at a first layer $L_1$ of first particles $P_1$. A portion of the incident ray I is reflected as first reflected ray $R_1$ that makes an angle with the plane of the first layer $L_1$ of the particles $P_1$. The other portion of the incident ray I is transmitted through the first layer of particles $P_1$ as ray T. The ray T is partially reflected from the second layer $L_2$ of the array 4 as second reflected ray $R_2$ that also makes an angle with the plane of the second layer $L_2$ of the particles $P_2$. The reflected ray $R_2$ is in phase with the reflected ray $R_1$. FIG. 2 shows the reflected rays $R_1$ and $R_2$ as originating from near the centers of the particles P. This is not meant to be limiting because reflection is considered to occur from the layers $L_1$–$L_x$ and can occur anywhere within the particles P. The wavelength of the reflected rays $R_1$ and $R_2$ satisfies the equation:

$$m = 2nd \sin \quad \text{Equation 1}$$

where m is an integer (m=1,2,3 . . . ), n is the effective refractive index of the colorant 2 and d is the distance between the layers of particles, e.g., $L_1$ and $L_2$. The effective refractive index (n) is closely approximated as a volume average of the refractive index of the particles $P_1-P_x$ (referred to as $RI_{particles}$) and the refractive index of the polymer matrix 6 (referred to as $RI_{polymer}$) present in the colorant 2 determined according to the equation:

$$n = (\text{vol. \% particles}/100) \times RI_{particles} + (\text{vol. \% polymer}/100) \times RI_{polymer} \quad \text{Equation 2}$$

For example, polystyrene particles have a refractive index of about 1.6. Polymethylmethacrylate has an index of refraction of about 1.49. For a colorant having an equal amount by volume of polystyrene particles $P_1-P_x$ and a polymethylmethacrylate matrix 6, the effective refractive index (n) of the colorant is 1.545.

FIG. 2 shows reflection of light from two layers $L_1-L_x$ of particles $P_1-P_2$. The interference effect, i.e. the intensity of the reflected light, may be increased by increasing the number of layers $L_1-L_x$ in the array 4. While at least two layers $L_1-L_2$ are required to induce a Bragg effect on the incident light, preferably at least about five and, more preferably, about five, six, seven, eight, nine or ten layers $L_1-L_x$ of particles $P_1-P_x$ are desired to achieve a desired intensity of reflected light. Fewer layers $L_1-L_x$ of particles $P_1-P_x$ reflect less light thereby decreasing the intensity of the reflected light and tending to broaden the wavelength of the reflected light. These effects, associated with fewer (two, three, or four) layers $L_1-L_x$, may be compensated for by increasing the difference between the $RI_{particles}$ and the $RI_{polymer}$. More than about ten layers $L_1-L_x$ may be used in certain applications where higher intensity reflected light is desired.

The average particle size of the particles $P_1-P_x$ is about 0.01 to about 1 micron, preferably about 0.06 to about 0.5 micron. The distance d between the layers $L_1-L_x$ is controlled substantially by the size of the particles $P_1-P_x$. If the particle size varies within a layer L or if the particle size varies between layers $L_1-L_x$, the spacing d between the layers $L_1-L_x$ will vary through the array 4. As noted above, the wavelength of light reflected under the Bragg condition is a function of the spacing d between the layers $L_1-L_x$. A distribution in particle size causes variation in the wavelength of reflected light that is viewed as a broad bandwidth of light exhibiting a blend of colors instead of a clean, sharp color. Therefore, in order to maintain a regular array, the particles $P_1-P_x$ are similarly sized and, preferably, differ in size from each other by a maximum of about 5 to about 15%.

For use in typical automotive coatings and industrial coatings (e.g., for cell phones) of conventional thickness, the colorant 2 preferably has a thickness no greater than about 20 microns, preferably less than about 10 microns, more preferably less than about 5 microns. Colorants substantially thicker than about 20 microns may be difficult to properly disperse and align in a typical automotive or industrial coating. Colorants substantially thicker than about 20 microns may also cause a roughening of the surface of a typical automotive or industrial coating, causing a reduction in the gloss of the coating, which may or may not be desirable. Thicker colorants 2 may be acceptable or desirable in other types of coatings that are thicker than automotive coatings, and may also be acceptable or desirable for example in plastic pigmentation, textiles, and cosmetics. The number of layers $L_1-L_x$ of particles $P_1-P_x$ in the colorant 2 is selected to achieve the desired optical properties using the minimum number of layers for achieving the desired intensity of color. At these dimensions, the colorant 2 has an aspect ratio that allows colorants in a coating composition to align with each other, and with the coated substrate, along their long axes. A suitable aspect ratio for the colorant 2 in an automotive coating composition is at least about 2, more preferably about 5 to 100, most preferably about 10.

The wavelength and intensity of the reflected light can be selected by varying the spacing (d) between the layers $L_1-L_x$ (by adjusting the size of the particles $P_1-P_x$), the number (x) of particle layers $L_1-L_x$, the difference in the refractive index between the polymeric matrix 6 and the particles $P_1-P_x$, and the effective refractive index (n) of the colorant 2 according to Table 2.

TABLE 2

| Variable (with other variables constant) | Increased variable | Decreased variable |
|---|---|---|
| Spacing between layers (d) | Longer | Shorter |
| Number of layers (x) | Higher intensity | Lower intensity |
| Difference in refractive index between particles and polymer | Higher intensity | Lower intensity |
| Effective refractive index of the colorant (n) | Longer | Shorter |

For example, if the reflected light in the visible spectrum is desired to be shifted to blue (to shorter wavelengths), the spacing (d) between the layers of the particles and/or the effective refractive index (n) may be decreased. Likewise, a red color shift (to longer wavelengths) of reflected light may be achieved by larger spacing between the particle layers and greater effective refractive index. In this manner, a particular color of reflected light may be selected. Not only is a particular color of reflected light selectable, but also by using particles with a narrow particle size distribution, the wavelengths of reflected light have relatively narrow bandwidths and exhibit a clean, sharp color.

The present invention is not limited to use in diffracting visible light. Other wavelengths of electromagnetic radiation outside the visible spectrum may be reflected as rays R, such as ultraviolet radiation or infrared radiation. The ordered array 4 in the matrix 6 may be used to reflect such radiation to prevent or minimize exposure of a substrate on which the array 4 is positioned to that radiation. The wavelength λ of the reflected radiation may be selected as described above by adjusting the effective refractive index n and the distance d between the layers $L_1-L_x$. Accordingly, while the ordered array 4 fixed in matrix 6 is generally termed a colorant herein, the ordered array 4 is not limited to use in providing colored reflected light but also is useful in reflecting other electromagnetic radiation.

Figure 3:
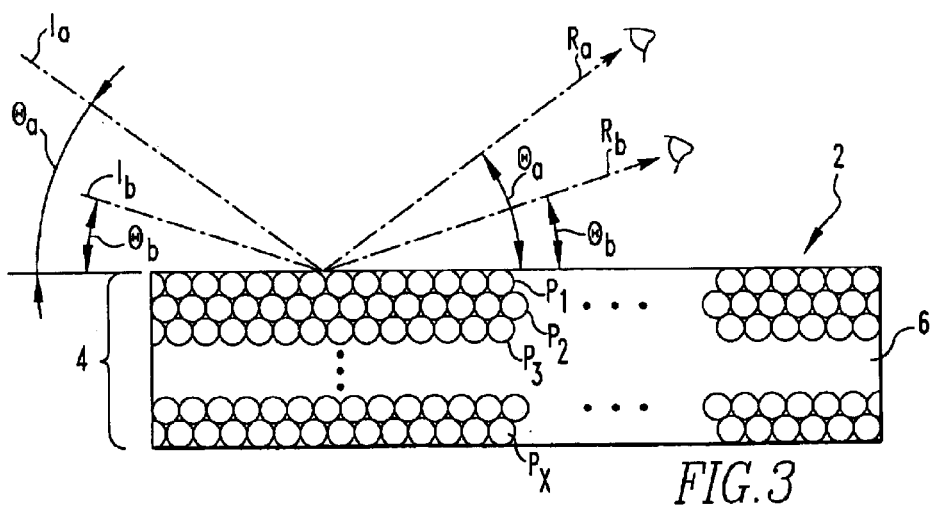
FIG. 3 is a cross-section of the colorant shown in FIG. 1 showing Bragg diffraction of visible light at two viewing angles.

The goniochromatic effect of the colorant 2 is depicted in FIG. 3. Multiple rays of incident light (only two being shown, $I_a$ and $I_b$) strike the colorant 2. Portions of the light of incident rays $I_a$ and $I_b$ are reflected from the colorant 2 as reflected rays $R_a$ and $R_b$. The angles $_a$ and $_b$ with which incident rays $I_a$ and $I_b$ strike the colorant 2 are different, hence the wavelength of light of reflected ray $R_a$ is different from the wavelength of light of reflected ray $R_b$ according to Equation 1. A goniochromatic effect is produced because the color of light of reflected ray $R_a$ visible from one viewing angle differs from the color of light of reflected ray $R_b$ visible from another viewing angle.

When the refractive index of the particles ($RI_{particles}$) is close to the refractive index of the polymer ($RI_{polymer}$), the polymer matrix composition may be adjusted to sufficiently change $RI_{polymer}$ to increase the difference between $RI_{particles}$ and $RI_{polymer}$. This may be accomplished by adding nanoscale particles (sized about 1 to about 50 nm) to the matrix 6. The nanoscale particles have particle sizes less than the wavelength of visible light and, thus, do not substantially reflect or scatter light. Suitable materials for the nanoscale particles that increase the effective $RI_{polymer}$ include metals (for example, gold, silver, platinum, copper, titanium, zinc, nickel), metal oxides (for example, aluminum oxide, cerium oxide, zinc oxide, titanium dioxide), mixed metal oxides, metal bromides, and semiconductors. Suitable materials for the nanoscale particles that decrease the effective $RI_{polymer}$ include metal oxides (for example silica), mixed metal oxides, and metal fluorides (for example, magnesium fluoride, calcium fluoride). Nanoscale air bubbles may also be produced in the polymer matrix to decrease $RI_{polymer}$. Similarly, the $RI_{particles}$ may be adjusted by adding nanoscale particles to the particles P.

Figure 4:
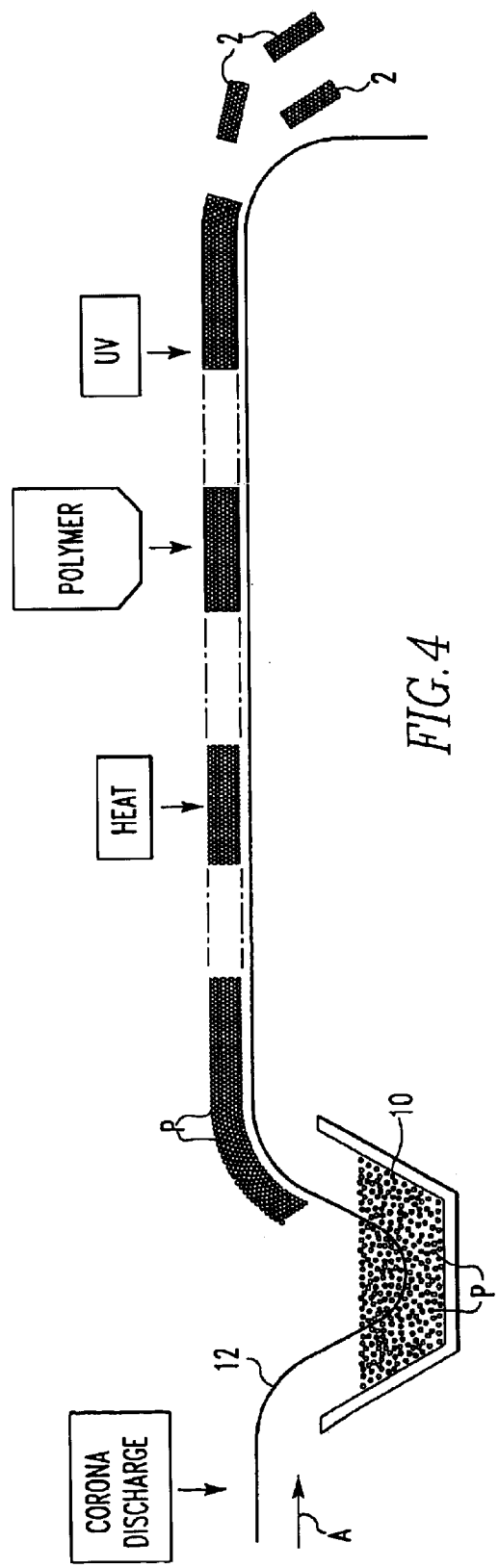
FIG. 4 is a schematic of a process for preparing the colorant of the present invention.

The present invention also includes a method of preparing the colorant of the present invention. As shown in FIG. 4, a dispersion 10 of the above-described particles P in a carrier is coated onto a substrate 12 which may be a flexible material (such as a polymer film, e.g., polyethylene terephthalate or metal strip) or an inflexible material (such as glass or metal plate). Preferably, the dispersion 10 of the particles P contains about 1 to about 70 vol. % of the particles, more preferably about 30 to about 65 vol. % of the particles. A suitable composition for the carrier is water. FIG. 4 depicts the substrate 12 traveling in the direction of arrow A and being dipped into a vessel containing the dispersion 10 to coat the dispersion 10 onto the substrate 12. Other methods of applying the dispersion 10 to the substrate 12 includes spraying, brushing, roll coating, gravure coating, curtain coating, flow coating, slot-die coating, or ink-jet coating. The substrate 12 may be treated prior to coating with the dispersion 10 to enhance wetting of the substrate 12 by the dispersion 10. The surface treatment may comprise corona, plasma, flame, ozone, or chemical treatments. The surface treatment may also comprise the deposition of a thin film coating composition of appropriate surface energy. The particles P in the dispersion 10 are all similarly charged which causes the particles P to repel each other and form a periodic array of particles P. The substrate 12 coated with a layer of the dispersion 10 is dried to remove the carrier from the dispersion 10 and allow the particles P to pack substantially adjacent to each other in three dimensions. The drying may be achieved using forced air, or by convective or radiative heating of the substrate 12 and/or the dispersion 10. Following the drying step, essentially only a periodic array of particles P remains on the substrate 12. The packed particles P on the substrate 12 are interpenetrated with a fluid matrix composition, such as a UV curable composition with high acrylate content, such as ethylene glycol dimethacrylate. The polymer may be applied to the packed particles via dipping, spraying, brushing, roll coating, gravure coating, curtain coating, flow coating, slot-die coating, or ink-jet coating. The matrix composition is cured (such as by exposure to ultra-violet light) to fix the array of packed particles P. Other curing mechanisms may be used to fix the matrix composition around the particles P. The substrate coated with particles encapsulated in the cured polymer may be used in that state as a goniochromatic film. Alternatively, the particles embedded in the polymeric matrix composition may be removed from the substrate 12 in the form of flakes of the colorant 2 or as a continuous film (not shown). The colorant flakes 2 are suitable for use as pigment particles in a coating composition, such as paint.

In another embodiment of the present invention, a coating composition having a perceived color that exhibits goniochromaticity, that is, the perceived color varies with angle of illumination or observation, is produced. The goniochromatic coating composition includes one or more film forming materials (which will be discussed in detail below) and a plurality of the colorants of the present invention and, if desired, other additives described below.

The type and amount of film-forming material and other components included in the coating composition will depend in part upon the nature of the coating and its method of application. No particular measures have been found necessary to incorporate the colorants of the present invention into typical coating formulations. If desired, for the sake of improved dispensability, the colorants can first be incorporated into a polymeric vehicle in the form of a paste, optionally aided by the addition of surfactants conventionally used with other types of pigments.

The specific colorant to film-forming component ratio can vary widely so long as it provides the requisite color appearance at the desired film thickness and application solids and will depend upon the particular ingredients employed, the type of surface to be coated, the intended use of the surface, as well as such factors as the specific size of the colorants used. On a volume basis, the amount of colorant would usually be similar to that employed with other color effect pigments, such as coated micas or natural pearlessence (fishsilver). Although there are no critical limits, the effects may not be perceptible in most applications at colorant concentrations less than 0.2 volume percent, and it would be unusual for a coating to contain more than 50 volume percent of these special effect colorants (the percentages based on total solids content of the coating composition).

The special effect colorants of the present invention can be used in a wide variety of coating compositions, such as paints and nail polish. These include waterborne and solvent-borne liquid coating compositions, powder coating compositions, powder slurry compositions, and electrodeposition compositions. They can be used in clear coatings (i.e., those that produce cured films having substantial transparency) or they can be added to other pigments and/or dyes in colored coatings. Functionally, the coatings that may include the colorants of the present invention include primers, basecoats, and topcoats, as well as any one or more of the coatings in a multi-coat combination. Compatibility of the colorants with a variety of polymer types has been observed, and it can be expected that any known film-forming polymer composition used for coatings could be used. Some of the more common families of polymer compositions used in coatings include polyurethanes, acrylic polymers, alkyd polymers, polyesters, siloxane-containing polymers, polysulfides, epoxy-containing polymers, and polymers derived from epoxy-containing polymers and combinations thereof. These are known to be provided in coatings as lacquers, thermoplastics, or thermosetting types of compositions. Thermosetting compositions will further include cross-linking agents, such as polyisocyanates, amino-formaldehyde aminoplasts, polyacids, polyanhydrides, and combinations thereof. As used herein, "film-forming" means that the film-forming materials form a self-supporting continuous film on at least a horizontal surface upon removal of any solvents or carriers present in the composition or upon curing at ambient or elevated temperature.

Volatile materials that can be included as diluents in the liquid or powder slurry coating compositions include water and/or organic solvents, such as alcohols, ethers and ether alcohols, ketones, esters, aliphatic and alicyclic hydrocarbons, and aromatic hydrocarbons as are commonly employed in the coating industry. Examples of solvents for coatings include aliphatic solvents, such as hexane, naphtha, and mineral spirits; aromatic and/or alkylated aromatic solvents, such as toluene, xylene, and SOLVESSO 100 (aromatic blend from Exxon Chemicals); alcohols, such as ethyl, methyl, n-propyl, isopropyl, n-butyl, isobutyl and amyl alcohol, and m-pryol; esters, such as ethyl acetate, n-butyl acetate, isobutyl acetate and isobutyl isobutyrate; ketones, such as acetone, methyl ethyl ketone, methyl isobutyl ketone, diisobutyl ketone, methyl n-amyl ketone, and isophorone, glycol ethers and glycol ether esters, such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate.

The coating compositions can further include one or more additives, such as UV absorbers and stabilizers, rheology control agents, surfactants, catalysts, film build additives, fillers, flatting agents, deformers, microgels, pH control additives, and other pigments. Along with the colorants of the present invention, it may be useful in some cases to also include conventional pigments and dyes. These include micas, iron oxides, carbon black, titanium dioxide, aluminum flakes, bronze flakes, coated mica, nickel flakes, tin flakes, silver flakes, copper flakes, and combinations thereof. Other organic coloring agents (i.e., dyes or organic pigments) could also be included. If it is desired to match the specific gravity of the polymeric and solvent components of the coating composition, the colorant content of the composition will have essentially no elemental metal components, and, preferably, essentially no metal oxide components as well.

Coated finishes, particularly for automobiles, are often provided by multiple layers of different coatings. An automobile coating may typically include an electrodeposited primer, a primer-surface coat, a colored basecoat, and a clear top coat. Additional coating layers may be used for appearance or performance purposes. The colorants of the present invention can be incorporated in an otherwise clear coat that is applied over a basecoat not containing the colorant but pigmented conventionally (i.e., the so-called "color-plus-clear" composite finish). Either or both of the basecoat and clear coat in this example may be waterborne as is known in the art.

In yet another alternative embodiment, the coating that includes the color effect colorant can be a basecoat, over which is applied a clearcoat that does not contain the colorant. The components of the basecoat and those of the clearcoat can be any of those discussed above.

In yet another alternative embodiment, the coating that includes the colorant can be a clearcoat that is applied over a basecoat that also contains colorant. The components of the basecoat and those of the clearcoat can be any of those discussed above.

In yet another alternative embodiment, the coating that includes the color effect colorant can be a clearcoat that is applied over a basecoat that does not contain colorant, and over which is applied another clearcoat that does not contain colorant. The components of the basecoat and those of the two clearcoats can be any of those discussed above.

The liquid or powder slurry coatings can be applied to the surface to be coated by any suitable coating process well-known to those skilled in the art, for example by dip coating, direct roll coating, reverse roll coating, curtain coating, spray coating, brush coating, gravure coating, flow coating, slot-die coating, ink-jet coating, electrodeposition, and combinations thereof. Powder coatings are generally applied by electrostatic deposition.

The present invention also includes use of the colorant (or radiation reflective material) 2 in other types of carriers than a film-forming component. Other non-limiting uses of the colorant 2 include as a component dispersed in a cosmetic or as a pigment impregnated into plastic.

The preparation and use of colorants of the present invention is illustrated in the examples that follow. The following examples are merely illustrative of the invention, and are not intended to be limiting. Unless otherwise indicated, all parts are by weight.

EXAMPLES

Example 1

Organic Polymer Matrix

An ultraviolet radiation curable organic composition was prepared via the following procedure. Diphenyl(2,4,6-trimethylbenzoyl)phosphine oxide/2-hydroxy-2-methylpropiophenone (40 grams), 50/50 blend from Aldrich Chemical Company, Inc., Milwaukee, Wis., in 116 g of ethyl alcohol and 250 g of ethoxylated(4) pentaerythritol tetraacrylate, from Sartomer Company, Inc., Exton, Pa., were added with stirring to 750 g neopentyl glycol diacrylate from Sartomer Company, Inc., Exton, Pa.

Example 2

Organic Particles

A dispersion of polystyrene-divinylbenzene particles in water, were prepared via the following procedure. One gram of sodium bicarbonate from Aldrich Chemical Company, Inc., was mixed with 853 g of deionized water and added to a reaction kettle, Model# 6947-2I from Corning, Inc., Corning N.Y., equipped with a thermocouple, baffles, stirrer, reflux condenser, heating mantle, and nitrogen inlet. The mixture was sparged with nitrogen for 40 minutes with stirring and blanketed with nitrogen. Aerosol MA80-I (8.2 g) from Cytec Industries, Inc., in 90 g deionized water was added to the mixture with stirring, and the mixture was heated to 50° C. using an electric mantle. Styrene monomer (360 g) from Aldrich Chemical Company, Inc., was added with stirring. 3-Allyloxy-2-hydroxy-1-propanesulfonic acid, sodium salt (17.2 g, 40% in water) from Aldrich Chemical Company, Inc., and 5 g of deionized water were added to the mixture with stirring. The mixture was heated to 60° C. Sodium persulfate from Aldrich Chemical Company, Inc., (4.5 g in 30 g of deionized water) was added to the mixture with stirring. The temperature of the mixture was maintained for 40 minutes. Divinyl benzene from Aldrich Chemical Company, Inc., (14 g), was added to the mixture with stirring and the temperature of the mixture was maintained at approximately 60° C. for 6 hours. The resultant polymer dispersion was allowed to cool to room temperature and was filtered through a 325 mesh stainless steel screen. The process was repeated three times. The four resultant dispersions were added together and ultrafiltered using a series tri-plate type ultrafilter with 150 mm diameter 50,000 NMWL PAN/PVC copolymer membranes, from Millipore Corporation, Bedford, Mass. and pumped using a diaphragm pump with a flow rate of approximately 250 ml per second. Deionized water (500 g) was added to the dispersion after 500 g of ultrafiltrate had been removed. This exchange was repeated 9 times. Additional ultrafiltrate was then removed until the solids content of the mixture was 40 percent by weight.

Example 3

Inorganic Particles

A dispersion of approximately 150 nm diameter silica particles in water was prepared via the following procedure. Ammonium hydroxide (12 g, 28% ammonia in water) from Aldrich Chemical Company, Inc., 40 g of deionized water, and 320 g reagent grade ethyl alcohol from Aldrich Chemical Company, Inc., were added to a 16 fluid ounce glass jar and the mixture was shaken for 30 seconds. Tetraethyl orthosilicate (80 g, 98% purity) and 320 g reagent grade ethyl alcohol, both from Aldrich Chemical Company, Inc., were added to a second 16 fluid ounce glass jar and the mixture was shaken for 30 seconds. The two mixtures were poured into a 32 fluid ounce glass jar and mixed by shaking for 60 seconds then maintained at room temperature for 3 hours. The resulting dispersion was pipetted in 100 ml aliquots into 25 mm flat width, 20 micron wall thickness, 12,000 to 14,000 molecular weight cut off regenerated cellulose dialysis tubing from Fisher Scientific, Pittsburgh, Pa., and dialysed against deionized water for approximately 500 hours. The deionized water was exchanged on average every 30 hours.

Example 4

700 Grams of material prepared in Example 2 was applied via slot-die coater from Frontier Technologies, Towanda, Pa.

to a polyethylene terephthalate substrate and dried at 150° F. for 1 minute to a porous dry film thickness of approximately 2.5 microns. 100 grams of material prepared in Example 1 was applied via slot-die coater from Frontier Industrial Technologies into the interstitial spaces of the porous dry film on the polyethylene terephthalate substrate, dried at 120° F. for 1 minute, and then ultraviolet radiation cured using a 100 W mercury lamp. The hardened film was then removed from the polyethylene terephthalate substrate.

Example 5
Colorant with Inorganic Particles

Example 4 was repeated except that the material prepared in Example 3 was used instead of the material from Example 2.

Example 6
Coating Composition Containing Colorant with Organic Particles

| Component | Wt. % |
|---|---|
| DCU2042 | 62.02 |
| DT870 | 13.60 |
| Example 4 material | 6.77 |
| DCX61 | 17.61 |
| Total | 100.00 |

The material prepared in Example 4 was incorporated into a coating in the following manner. The film from Example 4 was put into a porcelain mortar along with dry ice chips. With the aid of a porcelain pestle, the film was hand-ground for 15 minutes into a fine powder. The powder was dried in an oven set at 120° F. After 1 hour of drying and a 15 minute cooling period, the powder was added to a container containing a first component of a film-forming binder, DCU2042 (a clearcoat component available from PPG Industries, Pittsburgh, Pa.) and a diluent, DT870 (a reducer available from PPG Industries). The container was capped and hand-shaken for 1 minute. After shaking, the container was re-opened, and a second component of the binder, DCX61 (a crosslinking component available from PPG Industries) was added. The container was re-sealed and hand-shaken for 1 minute. The relative amounts of the paint components were as follows.

The resultant paint composition was ready for spray application. A panel (APR24711 available from ACT Laboratories, Inc., Hillsdale, Mich.) for evaluation was prepared by scuff-sanded with a very fine, Scotch-Brite pad (abrasive pad available from 3M Corp., Minneapolis, Minn.). The abraded panel was hand-wiped and cleaned with DX330 (a degreaser available from PPG Industries). After the sealed panel was dried and cured for 1 hour, the panel was coated with a black basecoat, D9700 diluted at 100% with D871 (basecoat and reducer package available from PPG Industries). After the basecoat dried for ½ hour, the panel was sprayed with the paint.

The panel coated with the paint was dried and cured for 24 hours. The panel was scuff-sanded with very fine Scotch-Brite pads wiped and cleaned with DX330, and was recoated with a protective clearcoat, DCU2042/DCX61.

After the protective clearcoat dried and cured for 24 hours, the coated panel was inspected for face and angle colorations. The coated panel parallel or at 0 degree to the observer provided a copper-red color. The same coated panel viewed at 45 degrees or greater to the observer provided a green color.

Example 7
Coating Composition Containing Colorant with Inorganic Particles

The procedure of Example 6 was followed except that the material for Example 5 was used in place of the Example 4 material.

After the protective clearcoat dried and cured for 24 hours, the coated panels were inspected for face and angle colorations. The coated panels parallel or at 0 degree to the observer provided a green color. The same coated panel viewed at 45 degrees or greater to the observer provided a blue color.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A colored composition comprising a carrier and a colorant in particulate form, wherein said colorant is produced by providing a dispersion of similarly charged particles in a carrier to produce an ordered periodic array of said particles, coating said array of particles with a matrix, and fixing said array of particles within said matrix, whereby said colorant comprises an ordered periodic array of said particles held in said matrix wherein a difference in refractive index between said matrix and said particles is at least about 0.01 and said matrix is a cross-linked polymer.

2. The colored composition of claim 1, wherein the difference in refractive index between said matrix and said particles is at least about 0.1.

3. The colored composition of claim 1, wherein said polymer is selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

4. The colored composition of claim 1, wherein said matrix is selected from the group consisting of a metal oxide and a semiconductor.

5. The colored composition of claim 1, wherein said particles comprise a polymeric material selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

6. The colored composition of claim 1, wherein said particles comprise a material selected from the group consisting of a metal oxide and a semiconductor.

7. The colored composition of claim 1, wherein said array is less than about 20 $\mu$m thick.

8. The colored composition of claim 1, wherein said array is less than about 10 $\mu$m thick.

9. The colored composition of claim 1, wherein said array is less than about 5 $\mu$m thick.

10. The colored composition of claim 7, wherein said array has an aspect ratio of at least about 2.

11. The colored composition of claim 7, wherein said array has an aspect ratio of about 5 to 100.

12. The colored composition of claim 7, wherein said array has an aspect ratio of about 10.

13. The colored composition of claim 1, wherein said particles are about 0.01 to about 1 micron in diameter.

14. The colored composition of claim 13, wherein the sizes of said particles differs by up to about 5 to about 15 percent.

15. The colored composition of claim 1, wherein said array includes at least about 5 layers of said particles.

16. The colored composition of claim 1, wherein said array of particles includes about 10 to about 30 layers of said particles.

17. The colored composition of claim 1, wherein said carrier comprises a resinous binder.

18. The colored composition of claim 1, wherein said composition is a paint.

19. The colored composition of claim 1, wherein said composition is a cosmetic.

20. The colored composition of claim 1, wherein said matrix or said particles further comprise a plurality of nanoscale particles.

21. The colored composition of claim 20, wherein said nanoscale particles increase the refractive index of said matrix or particles.

22. The colored composition of claim 21, wherein said nanoscale particles are selected from the group consisting of a metal, a metal oxide, a mixed metal oxide, a metal bromide, and a semi-conductor.

23. The colored composition of claim 20, wherein said nanoscale particles decrease the refractive index of said matrix or particles.

24. The colored composition of claim 23, wherein said nanoscale particles are selected from the group consisting of a metal oxide, a mixed metal oxide, and a metal fluoride.

25. A radiation diffraction material comprising an ordered periodic array of particles held in a matrix, wherein said radiation diffractive material is produced by providing a dispersion of similarly charged particles in a carrier to produce an ordered periodic array of said particles, coating said array of particles with a matrix, and fixing said array of particles within said matrix, wherein a difference in refractive index between said matrix and said particles is at least about 0.01 and said matrix is a cross-linked polymer.

26. The radiation diffraction material of claim 25, wherein the difference in refractive index between said matrix and said particles is at least about 0.1.

27. The radiation diffraction material of claim 25, wherein said polymer is selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

28. The radiation diffraction material of claim 25, wherein said matrix is selected from the group consisting of a metal oxide and a semiconductor.

29. The radiation diffraction material of claim 25, wherein said particles comprise a polymeric material selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

30. The radiation diffraction material of claim 25, wherein said particles comprise a material selected from the group consisting of a metal oxide and a semiconductor.

31. The radiation diffraction material of claim 25, wherein said array is less than about 20 $\mu$m thick.

32. The radiation diffraction material of claim 25, wherein the sizes of said particles differs by up to about 5 to about 15 percent.

33. The radiation diffraction material of claim 25, wherein said particles are about 0.01 to about 1 micron in diameter.

34. The radiation diffraction material of claim 25, wherein said particles are about 0.06 to about 0.5 micron in diameter.

35. The radiation diffraction material of claim 25, wherein a surface of each said particle contacts another said particle.

36. The radiation diffraction material of claim 35, wherein said particles are arranged in a plurality of layers.

37. The radiation diffraction material of claim 36, wherein said array includes at least about 5 of said layers of particles.

38. The radiation diffraction material of claim 36, wherein said array of particles includes about 10 to about 30 layers of said particles.

39. The radiation diffraction material of claim 25, wherein said particles comprise about 25 to about 80 vol. % of the colorant.

40. The radiation diffraction material of claim 25, wherein said particles comprises about 72 to about 76 vol. % of the colorant.

41. The radiation diffraction material of claim 25, wherein said material reflects visible light.

42. The radiation diffraction material of claim 25, wherein said material reflects electromagnetic radiation outside the visible spectrum.

43. A radiation diffractive composition comprising a carrier and a radiation reflective material comprising an ordered array of particles held in a matrix wherein a difference in refractive index between said matrix and said particles is at least about 0.01.

44. The radiation diffractive composition of claim 43, wherein the difference in refractive index between said matrix and said particles is at least about 0.1.

45. The radiation diffractive composition of claim 43, wherein said matrix is a cross-linked polymer.

46. The radiation diffractive composition of claim 45, wherein said polymer is selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

47. The radiation diffractive composition of claim 43, wherein said matrix is selected from the group consisting of a metal oxide and a semiconductor.

48. The radiation diffractive composition of claim 43, wherein said particles comprise a polymeric material selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

49. The radiation diffractive composition of claim 43, wherein said particles comprise a material selected from the group consisting of a metal oxide and a semiconductor.

50. The radiation diffractive composition of claim 43, wherein said material reflects visible light.

51. The radiation diffractive composition of claim 43, wherein said material reflects electromagnetic radiation outside the visible spectrum.

52. A method of fixing an array of particles in a matrix comprising the steps of:
(a) providing a dispersion of similarly charged particles in a carrier to produce an ordered periodic array of the particles;
(b) coating the array of particles with a matrix; and
(c) fixing the array of particles within the matrix.

53. The method of claim 52, wherein the dispersion comprises about 1 to about 70 vol. % of the charged particles.

54. The method of claim 52, wherein the dispersion comprises about 30 to about 65 vol. % of the charged particles.

55. The method of claim 52, wherein said step of providing a dispersion of charged particles further comprises (i) dispersing the charged particles in the carrier to produce a pre-dispersion and (ii) purifying the pre-dispersion to produce the dispersion.

56. The method of claim 55, wherein step (ii) comprises purifying the pre-dispersion via ultra filtration.

57. The method of claim 55, wherein step (ii) comprises purifying the pre-dispersion via ion exchange, dialysis, electrostatic separation, field flow fractionation, or centrifugation.

58. The method of claim 52 futher comprising, prior to step (c), steps of:

applying the dispersion onto a substrate; and evaporating the carrier to produce an ordered periodic array of the particles on the substrate.

59. The method of claim 58 further comprising removing the fixed array of particles from the substrate.

60. The method of claim 59, wherein the substrate is a flexible member.

61. The method of claim 60, wherein the flexible member comprises a polymer film or metal.

62. The method of claim 59, wherein the substrate comprises an inflexible member.

63. The method of claim 62, wherein the inflexible member comprises glass or metal.

64. The method of claim 52, wherein the fixed array produced in step (c) is less than about 20 $\mu$m thick.

65. The method of claim 52, wherein the dispersion is applied to the substrate by dipping, spraying, brushing, roll coating, gravure coating, curtain coating, slot-die coating, or ink-jet coating.

66. The method of claim 52, wherein the matrix is coated onto the array of particles by dipping, spraying, brushing, roll coating, gravure coating, curtain coating, slot-die coating, or ink-jet coating.

67. The method of claim 52, wherein the fixed array of particles are removed from the substrate in the form of flakes.

68. The method of claim 52, wherein the carrier is water.

69. The method of claim 52, wherein the matrix is a curable polymer and step (c) comprises curing the polymer.

70. The method of claim 69, wherein the polymer is selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

71. The method of claim 52, wherein said matrix is selected from the group consisting of a metal oxide and a semiconductor.

72. The method of claim 52, wherein said particles comprise a polymeric material selected from the group consisting of a polyurethane, an acrylic polymer, an alkyd polymer, a polyester, a siloxane-containing polymer, a polysulfide, an epoxy-containing polymer, and a polymer derived from an epoxy-containing polymer.

73. The method of claim 52, wherein said particles comprise a material selected from the group consisting of a metal oxide and a semiconductor.

* * * * *